P. MUELLER.
FULLER BALL.
APPLICATION FILED NOV. 12, 1919.

1,350,378.

Patented Aug. 24, 1920.

Inventors
Philip Mueller

Witnesses

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FULLER-BALL.

1,350,378.  Specification of Letters Patent.  Patented Aug. 24, 1920.

Application filed November 12, 1919. Serial No. 337,487.

*To all whom it may concern:*

Be it known that I, PHILIP MUELLER, a citizen of the United States, and residing at Decatur, in the county of Macon and State of Illinois, have invented new and useful Improvements in Fuller-Balls, of which the following is a specification.

This invention relates to cocks or faucets and particularly to fuller balls, and has as its objects to provide an improved fuller ball wherein wear of the elastic valve body and strains, tending to crush this body or cause it to assume abnormal shapes, are reduced to a minimum, so that the useful life of the valve is materially prolonged; and to provide a fuller ball which is efficient in operation and which is very simple in construction so that it may be manufactured and placed on the market at a low cost, and so that it may be readily assembled and disassembled.

The above and other objects of my invention are obtained in the structure described in the following specification and illustrated in the accompanying drawing, and wherein:—

Figure 1:
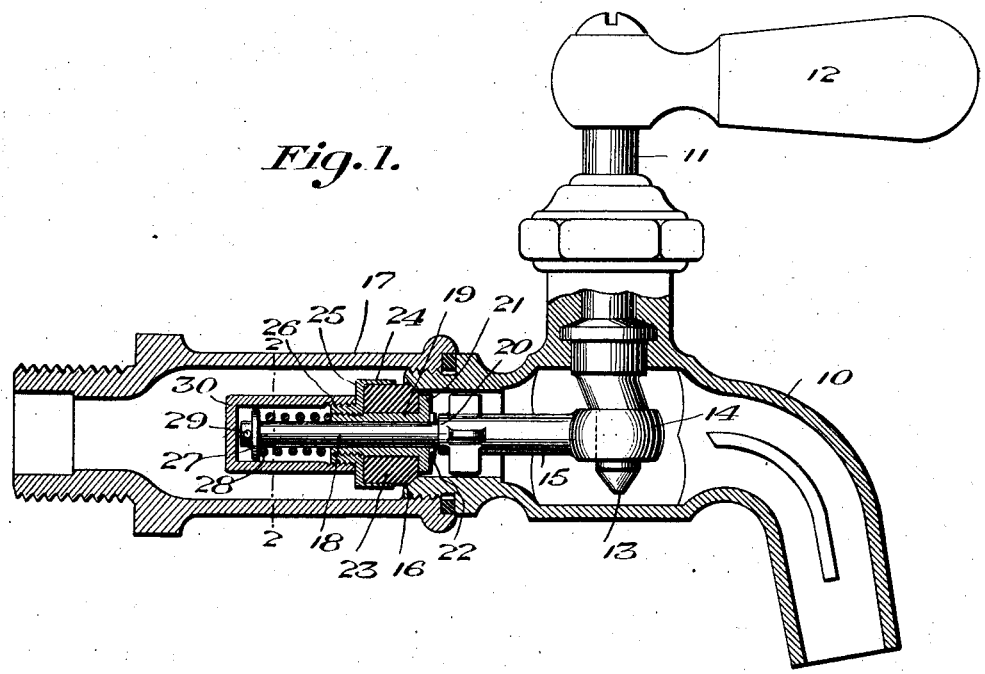
Figure 2:
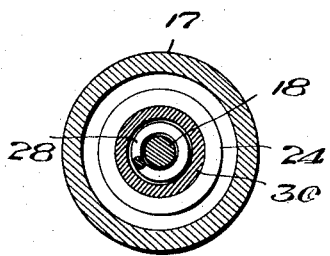

Figure 1 is a longitudinal sectional view through a cock or faucet to which my improved fuller ball is applied, Fig. 2 is a transverse sectional view taken on line 2—2 of Fig. 1.

In the drawings, 10 designates a cock or faucet body through the neck portion of which passes a stem 11 having on its outer end a handle 12 and on its inner end an eccentric portion 13, and connected to this eccentric portion, by means of a strap 14, is the valve stem 15. The shank portion of the cock body has an internal valve seat 16 and the shank is externally threaded so as to receive the internal threads of the tail piece 17.

It is understood, of course, that I have shown the present type of cock for illustrative purposes only, and that my improved valve may be applied to other types of cocks or faucets than that disclosed herein.

The valve stem 15, at its inner end, is of reduced diameter, as at 18, and upon this reduced portion of the valve stem is slidably mounted a sleeve 19 which is limited in its forward movement by means of the shoulder 20. The forward end of the sleeve 19 has a circumferential flange or collar 21 which is of slightly less diameter than the diameter of the bore through the shank portion of the lock body so as to move thereinto when the valve is brought into closed position.

The forward end of the sleeve has a slot 22 for the reception of a screw driver or other tool when the parts of the valve are being assembled. The inner end of the sleeve 19 is externally threaded and the opening in the sleeve through which the stem 18 passes closely receives the stem, there being, however, sufficient clearance therebetween to permit of a free sliding movement of the sleeve.

The numeral 23 designates the elastic valve body which, in the present instance, is substantially cylindrical in shape and it has a through opening for the reception of the sleeve 19. The valve body 23 is of such length as to encircle the sleeve 19 between the flange 21 and the externally threaded portion of the sleeve and its forward end is beveled so as to provide a conical seating surface adapted to engage against the valve seat 16. The elastic valve body is maintained upon the sleeve with its valve seat end against the flange 21 by means of a ferrule or protecting shell which incases the inner end of the elastic valve body, this ferrule, in the present instance, having a cylindrical portion 24, an end wall 25 and a nipple 26 extending from the end wall and being concentric to the cylindrical portion 24. The nipple 26 is internally and externally threaded and the internal threads receive the inner threaded end of the sleeve 19. The cylindrical portion 24 of the ferrule encircles the valve body 23 and terminates somewhat short of the valve seat end thereof.

Mounted upon the inner end of the reduced portion 18 of the valve stem and located between the inner end of the sleeve 19 and a collar 27 is a coiled spring 28 which is held under limited compression so as to yieldingly urge the valve forwardly upon the stem. The collar 27 is secured against removal from the stem by means of a pin 29, which pin passes through a transverse opening in the stem.

An elongated cylindrical cap 30 is internally threaded at its open end so as to receive the external threads of the nipple 26, and this cap, as will be seen from the drawing, houses the spring 28 and the collar 27.

In assembling the parts of my improved valve, the elastic valve body 23 is first slipped upon the sleeve 19 with its valve seat end engaging the flange 21. The ferrule 24 is then screwed onto the threaded end of the sleeve, the ferrule 24 being held against rotation while the sleeve is being turned by means of a screw driver engaging within the slot 22. The assembly is now slipped upon the reduced end 18 of the valve stem; the spring 28 is slipped upon the inner end of the valve stem and placed under compression by the collar or washer 27, and the collar is held in place by inserting the pin 29 in the transverse hole in the stem. The cap 30 is then screwed onto the nipple 26.

In operation when the handle is turned to bring the valve into closed position, the valve body 23 will engage the seat 16 and upon continued turning of the handle, the stem 15 will move forwardly of the sleeve 19 and thus the spring 28 will be placed under a greater degree of compression. The spring thus takes up the greater portion of the strain which would be exerted upon the valve body if the spring was not provided. When the handle is turned in a direction to cause a flow of fluid through the cock, the stem moves rearwardly and the shoulder 20 thereof engages the sleeve, to move the sleeve together with the valve body 23 carried thereby from the valve seat 16.

It will be seen that my improved valve comprises a relatively small number of parts which may be easily manufactured at a small cost. The parts may be easily assembled. The valve body is supported by the sleeve 19, the flange 21 and the protecting ferrule, so that the valve body is not alternately elongated and contracted to any great extent when opening and closing the cock.

It is obvious that should the collar 21 of the sleeve 19 be omitted and the valve body 23 overhang the forward end of the sleeve and engage the valve stem, the valve body would tend to bind about the valve stem and when the stem was reciprocated there would be a tendency for the forward end of the valve body to be pinched between the shoulder 20 and the forward end of the sleeve 19. The valve body, since it is incased, except at its seating surface, cannot assume abnormal shapes when placed under pressure and thus the life of the ball is greatly increased.

It is obvious that my invention is susceptible to various changes and modifications.

What I claim is:

1. In combination, a valve stem, a sleeve having a through opening of like diameter throughout its length adapted to receive said stem, means on the stem for limiting forward movement of said sleeve thereon, an elastic valve body upon said sleeve, a flange carried by the sleeve and against which the valve seat end of the elastic valve body engages, a ferrule carried by said sleeve and encircling the inner end of said elastic body, and yieldable means upon said stem and engaging said sleeve for urging said sleeve forward on said stem.

2. In combination, a valve stem, a sleeve having a through opening of like diameter throughout its length adapted to receive said stem, means on the stem for limiting forward movement of the sleeve thereon, a flange on the forward end of said sleeve, an elastic valve body encircling the sleeve and engaging against said flange, a ferrule threaded upon the inner end of the sleeve and against said elastic valve body, and yieldable means carried by the stem and engaging the inner end of the sleeve for urging the sleeve forwardly on the stem.

3. In combination, a valve stem, a sleeve having a through opening of like diameter throughout its length and adapted to receive said stem, an abutment on the stem for limiting forward movement of said sleeve, a flange on the forward end of said sleeve, an elastic valve body about said sleeve and engaging said flange, a ferrule threaded upon the inner end of said sleeve and against said elastic valve body, a spring about the inner end of said stem and engaging said sleeve for urging said sleeve toward said abutment, and a cap housing said spring and threaded on to said ferrule.

4. In combination, a valve stem, a sleeve slidably mounted upon said stem and having its inner end externally threaded, a flange upon the forward end of said sleeve, an abutment on said stem for limiting the forward movement of said sleeve, an elastic valve body upon said sleeve abutting said flange, a ferrule encircling the inner end of said elastic valve body and having a nipple internally threaded to receive the threaded portion of said sleeve, said nipple being externally threaded, yieldable means about said stem and engaging said sleeve for urging said sleeve toward said abutment, and a cap housing said yieldable means and screwed onto said nipple.

5. In combination, a valve stem, a sleeve slidably mounted upon said stem and having its inner end threaded, a flange on the forward end of said sleeve, an abutment on the stem for limiting the forward movement of said sleeve, an elastic valve body adapted to be slipped over the threaded end of said sleeve and to abut at its valve seat end against said flange, a member screwed upon the threaded portion of said sleeve and against the inner end of said elastic valve body, and yieldable means carried by the stem and engaging said sleeve to urge the sleeve toward said abutment.

6. In combination, a valve stem, a sleeve slidably mounted upon the stem and having its inner end threaded and a flange on its forward end, means on the stem for limiting forward movement of said sleeve, an elastic valve body adapted to be slipped over the threaded end of said sleeve and against said flange, a ferrule screwed upon the threaded portion of said sleeve and having a portion encircling said elastic valve body, and a spring carried by the stem and engaging said sleeve for urging the sleeve toward said limiting means.

7. In combination, a valve stem, a sleeve slidably mounted upon said stem and having its inner end threaded, a flange on the forward end of said sleeve, an abutment on the stem, an elastic valve body adapted to be slipped over the threaded end of said sleeve and against said flange, a ferrule encircling the inner end of said elastic valve body and having a nipple internally threaded to receive the threaded end of said sleeve, a spring about said stem and engaging the inner end of the sleeve for urging the sleeve toward said abutment, and a cap housing said spring and having internal threads adjacent its open end, said nipple being threaded to receive said cap.

8. In combination, a valve stem, a sleeve slidably mounted upon said stem and having its inner end threaded, a flange on the forward end of said sleeve said sleeve being of like diameter throughout its length except at said flange, an elastic valve body having an opening of like diameter throughout its length adapted to receive the body portion of said sleeve, a ferrule encircling the inner end of said elastic valve body, and having a nipple internally threaded to receive the threaded portion of said sleeve, an abutment on the stem for limiting the forward movement of the sleeve, a spring for urging the sleeve toward said abutment, a cap housing said spring and having internal threads adjacent its open end to engage external threads upon said nipple.

In testimony whereof I have hereunto set my hand.

PHILIP MUELLER.